Sept. 17, 1957 D. K. FERRIS 2,806,402
PROPELLER BLADE ANGLE INDICATING DEVICE
Filed Oct. 4, 1954 2 Sheets-Sheet 1

INVENTOR.
DONALD K. FERRIS
BY
Craig V. Morton
ATTORNEY

Sept 17, 1957  D. K. FERRIS  2,806,402
PROPELLER BLADE ANGLE INDICATING DEVICE
Filed Oct. 4, 1954  2 Sheets-Sheet 2
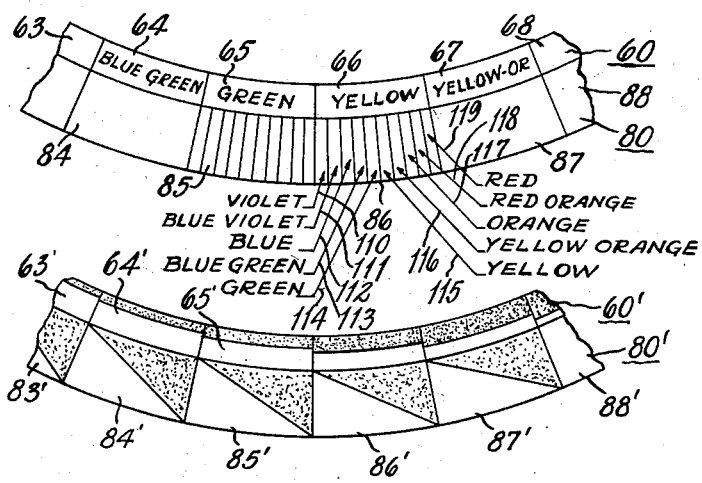
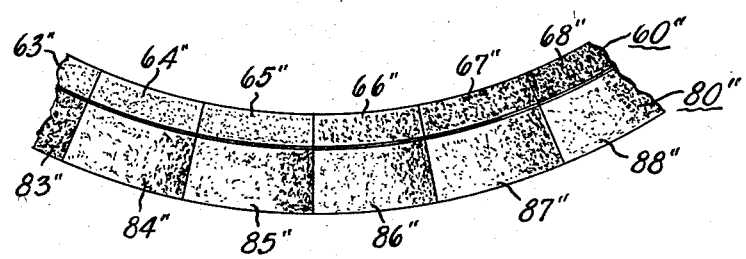
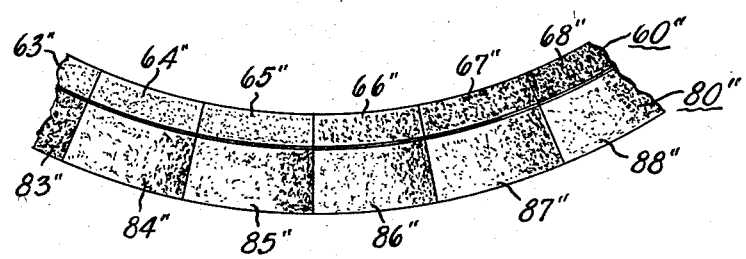
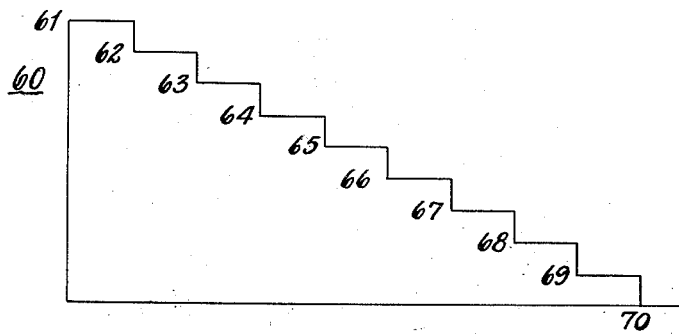
Fig. 7.
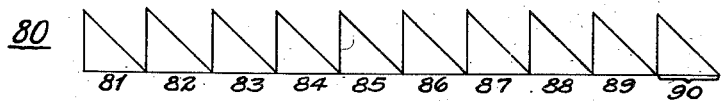
Fig. 8.
INVENTOR.
BY DONALD K. FERRIS
Craig V. Morton
ATTORNEY United States Patent Office 2,806,402
Patented Sept. 17, 1957

2,806,402

PROPELLER BLADE ANGLE INDICATING DEVICE

Donald K. Ferris, West Milton, Ohio, assignor to General Motors Corporation, Detroit, Mich., a corporation of Delaware Application October 4, 1954, Serial No. 459,906

7 Claims. (Cl. 88—14)

This invention pertains to indicating devices, and particularly to means for indicating the angle of variable pitch propeller blades during propeller rotation.

Heretofore, various blade angle measuring devices have been designed for indicating the pitch angle of rotating propeller blades. However, prior indicating devices require either physical contact with the blades or a portion thereof, or require electrical connections between relatively rotatable members by means of a brush and slip ring assembly. One of the salient features of this invention resides in the fact that physical contact between relatively rotatable members is eliminated. Accordingly, among my objects are the provision of means for accurately indicating the pitch angle of propeller blades while the propeller is rotating; the further provision of means which are operable to indicate blade angle without having physical contact with the blade; and the still further provision of light sensitive means for indicating the angular position of a rotatable element.

The aforementioned and other objects are accomplished in the present invention by providing means sensitive to either the wave length or intensity of light reflected from, or transmitted through, colored, variable area, or variable density sectors carried by and rotatable with a propeller blade. Specifically, the apparatus disclosed herein includes a source of light, the rays of which are transmitted through a pair of Lucite bars, one being stationary and the other being rotatable with the propeller. Thus, during every revolution of the propeller, light will be transmitted between the juxtaposed Lucite bars. The Lucite bar assembly, which is rotatable with the propeller, transmits light through a pair of concentric sectors which are attached to and rotatable with the propeller blade during pitch changing movements thereof. A second Lucite bar assembly receives the light transmitted through the sectors and transmits the same to a light sensitive circuit including a pair of photoelectric cells.

It is well known that the sensitivity of certain photoelectric cells has a substantially linear relationship to the wave length of light transmitted thereto at a substantially constant intensity, while other photoelectric cells have a linear response curve varying with light intensity. This invention utilizes either of these phenomena to indicate the pitch angle of rotating propeller blades. Thus, the concentric, intelligence sectors partially circumscribe the hub portion of the propeller blade. The inner of the concentric sectors is divided into ten sections, each having an arcuate length, or subtending an angle, of substantially 10°. Moreover, each section is of a different color, a variable area, on a variable density, and the sections are arranged so that either the wave length or the intensity of light transmitted therethrough, or reflected therefrom, varies progressively from one end of the sector to the other. The outer concentric sector is, likewise, divided into ten sections each having an arcuate distance of substantially 10°. Each section of the outer sector is likewise arranged so that either the wave length or the intensity of light transmitted therethrough, or reflected therefrom, varies progressively from one end to the other.

One of the photoelectric cells receives light from the inner concentric sector, while the other photoelectric cell receives light from the outer sector. Accordingly, one of the photoelectric cells determines the particular sector through which light is transmitted, this cell being connected to operate a meter which is calibrated in units of ten. The other photoelectric cell is connected to a meter, which is calibrated in units of one or less.

Further objects and advantages of the present invention will be apparent from the following description, reference being had to the accompanying drawings wherein a preferred embodiment of the present invention is clearly shown.

Figs. 4, 5, and 6 are fragmentary views, respectively, of colored intelligence sectors, variable area intelligence sectors, and variable density intelligence sectors.

Fig. 7 depicts the response curve for photoelectric cell associated with the inner intelligence sector.

Fig. 8 depicts the response curve for the photoelectric cell associated with the outer intelligence sector.

Figure 1:
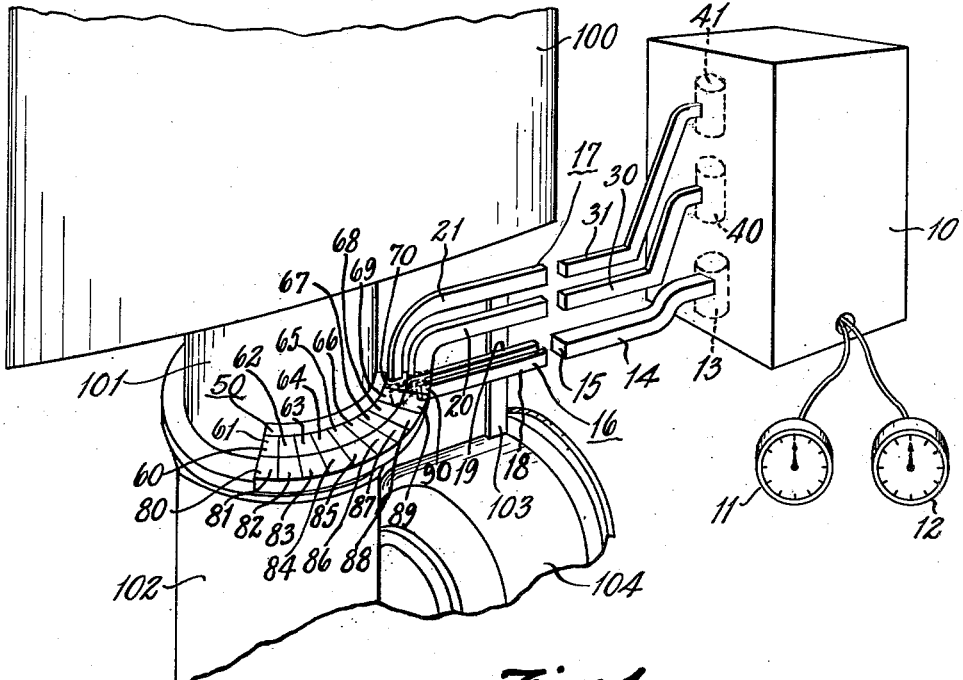
Fig. 1 is a perspective view of the indicating means of this invention shown in conjunction with a fragmentary propeller assembly.

With particular reference to Fig. 1, the indicating device of this invention is depicted as including a box 10 having electrical connection with two meters 11 and 12, that are remotely located within an aircraft. The box 10 encloses a light source 13, which is disposed in alignment with a light transmitting bar 14, which may be composed of Lucite (polymerized methyl methacrylate), or any other suitable material which has the property of transmitting rays of light around corners. The box 10 may be mounted at any suitable point in the aircraft, and, accordingly, is stationary relative to the propeller blades. The Lucite bar 14 extends from the box 10 so that the end 15 thereof is disposed in contiguous relation to a propeller blade 100.

The propeller blade 100 includes a root portion 101, which is supported for rotation about its longitudinal axis by a hub assembly 102, in any suitable manner well known in the art. The propeller blade 100 is capable of rotation about its longitudinal axis to vary pitch positions by means of any suitable pitch changing means, which are carried by and rotatable with the propeller. The propeller includes a regulator 104 having attached thereto an upright member 103, which supports Lucite bar assemblies 16 and 17. It will be appreciated that inasmuch as the propeller hub 102, the regulator 104 and the Lucite bar assembly 16 rotate about a horizontal axis relative to the Lucite bar 14, the juxtaposed end portions of the bar 14 and the assembly 16 will only be in alignment for a short interval during each revolution of the propeller hub. The Lucite bar assembly 16 may be composed of two bars 18 and 19, the ends of which are disposed in the same vertical plane, and the purpose of which will be described more particularly hereinafter.

Figure 2:
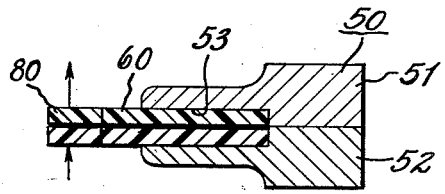
Fig. 2 is a sectional view through one of the intelligence sections.

The root portion 101 of the propeller blade has attached thereto by any suitable means such as a weld, an arcuate segment assembly 50, as shown in Fig. 1. As shown in Fig. 2, the arcuate segment assembly 50 may comprise a pair of members 51 and 52, the marginal edges of which are relieved to form an arcuate groove 53 within which the intelligence sectors, to be described, are mounted. The arcuate assembly 50 supports a Lucite assembly having a pair of concentric intelligence sectors 60 and 80. The intelligence sectors 60 and 80 encompass the root portion 101 of the blade throughout an angular distance of substantially 100°, as shown in Fig. 1. However, the angular extent of the intelligence sectors may vary dependent upon the range of angular adjustment of the propeller blades. The intelligence sector 60 is divided into ten sections, or segments, 61 through 70. Each segment extends throughout an arcuate distance of substantially 10°, and in the preferred embodiment each segment is composed of transparent material of a different color. In particular, the colored segments 61 through 70 are arranged so that the wave length of light transmitted therethrough increases progressively from the segment 61 to the segment 70. Thus, the segment 61 may be violet, whereas the segment 70 may be red.

The outer intelligence sector 80 is, likewise, divided into 10 segments, or sections, 81 through 90. Each of the intelligence segments 81 through 90, likewise, encompasses an arcuate distance of substantially 10°, and is further divided into ten equal portions, which have an arcuate distance of substantially 1°, as shown in Fig. 4. Similarly, in the preferred embodiment the ten portions in each of the segments 81 through 90 are colored so that the wave length of light transmitted therethrough increases progressively in a counter-clockwise direction, as viewed in Fig. 1. Thus, the first portion of each of the colored segments 81 through 90 may be violet, whereas the last portion of each colored segment may be red. Actually, each segment transmits a portion of the visible spectrum and the demarcation between the colored portions is hardly noticeable.

The Lucite bar 18 terminates in contiguous relation to the colored sector 80, whereas the Lucite bar 19 terminates in contiguous relation to the colored segment 60. The Lucite bar assembly 17 is composed of two bars 20 and 21 which are in the same vertical plane. The bar 20 has its end portion disposed in contiguous relation to the colored sector 80 whereas bar 21 has its end portion disposed in contiguous relation to the colored sector 60. Accordingly, light transmited from the source 13 through the bar 14, and the bar assembly 16 will have portions thereof transmitted through the colored sectors 60 and 80, and while the color intelligence from the sector 60 is transmitted through bar 21, the color intelligence from sector 80 is transmitted through bar 20. The sectional areas of the ends of the bars 18 through 21 adjacent the sectors 60 and 80 are of a shape to cover a one degree section of the sectors such as sections 81 through 90 of sector 80.

The Lucite bar assembly 17 is carried by the upright member 103 so that during every revolution of the propeller, the end portions thereof are positioned in alignment with two Lucite bars 30 and 31, which constitute the light input for two photoelectric cells 40 and 41. Accordingly, during every revolution of the propeller, the photoelectric cells 40 and 41 will be simultaneously energized by the intelligence from Lucite bars 30 and 31 as transmited thereto through Lucite bars 20 and 21. It should be noted that the cells 40 and 41 will only be energized when the end surfaces of Lucite bars 20, 21 and 30, 31 are in alignment, which phenomenon occurs only once during each propeller revolution.

The tube 41 is electrically connected by any suitable means, not shown, with the meter 12, which is calibrated in units of 10. As the cell 41 responds to the intelligence of the segments in sector 60, which segments extend throughout substantially 10°, the meter 12 may be so calibrated. The meter 11 is also divided into ten segments which are calibrated in units of 1°, since the tube 40 receives intelligence from the segments of sector 80, which segments have portions that extend throughout an arcuate distance of substantially 1°.

With particular reference to Figs. 7 and 8, the response characteristics of the photoelectric cells 40 and 41 will be described, it being understood that irrespective of the type of intelligence signals, i. e. whether variable wave length or variable intensity, the response curves are substantially linear within the measuring range. The tube 41 responds to the intelligence signal from sector 60, which as aforedescribed includes a plurality of sections 61–70, each subtending an angle of 10°. Moreover, each section is homogeneous throughout, so that the cell 41, and, hence, the meter 12, will have the same excitation as long as the light from source 13 is modified by that particular section. Thus, the output signal of tube 41 will be of a stepped waveform as shown in Fig. 7. In this manner, the meter 12 will indicate the particular section, i. e. 0°, 10°, 20°, etc., through which light is being received by cell 41.

However, photoelectric cell 40 has an output waveform of saw-tooth configuration, as shown in Fig. 8, inasmuch as the light is modified continuously by successive portions of the sections 81–90 of sector 80. Thus, the meter 11 will have a reading between zero and 10 within each section, and the angle of the blades can be easily determined by reading the units of ten from meter 12 and the units of one from meter 11.

Figure 3:
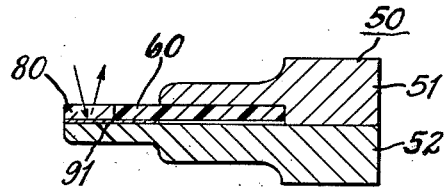
Fig. 3 is a sectional view through a modified intelligence section.

The colored sectors may be constructed in the manner shown in Fig. 2, wherein the light is transmitted through the colored portions of the sectors. However, in some instances, it may be desirable to receive reflected light, and a colored sector of this type is depicted in Fig. 3. Thus, in Fig. 3, the colored sectors 60 and 80 have one surface thereof faced with a reflective, or mirrored, portion 91.

With reference to Fig. 4, it may be seen that the colored portions within each segment of the sector 80 are arranged from the left to the right so that the wave length of the light transmitted therethrough increases progressively, as in the visible spectrum. Thus, portion 110 is violet, 111 is blue-violet, 112 is blue, 113 is blue-green, 114 is green, 115 is yellow, 116 is yellow-orange, 117 is orange, 118 is red-orange, and 119 is red. The colored segment 64 of sector 60 represents blue-green. Moreover, while the colored portion within each segment of sector 80 are shown composed of constant density, it is to be understood that the colors merge with each other so that lines of demarcation between the colored portions are hardly noticeable.

The operation of the indicating means is believed to be obvious from the aforegoing description. However, a brief resume of the operation is as follows: the photoelectric cell 41, which activates meter 12 indicates blade angle in units of 10°, whereas the cell 40 is operable to activate the meter 11 so as to indicate blade angle in units of 1°. Accordingly, to ascertain the blade angle at any angular position of the blade 100, it is only necessary to read the meters 11 and 12, which meters will receive pulses from the photoelectric cells during rotation of each propeller. At high speed propeller operation, however, the meters will continuously indicate blade angle, inasmuch as the frequency of light pulses will exceed the frequency response sensitivity of the meters 11 and 12, which may be suitably damped.

With particular reference to Figs. 5 and 6, modified intelligence sector arrangements are disclosed, wherein the intensity of light is varied rather than the wave length, as in the preferred embodiment. Thus, in the embodiment of Fig. 5, each segment of sector 60' includes a variable area which is tinted so as to modify the light intensity. Thus, the entire area of the section corresponding to section 70 in the preferred embodiment is tinted homogeneously, while the other sections have progressively reduced tinted areas. Similarly, each segment within sector 80' has a saw-tooth variable area which is homogeneously tinted, the segments being repetitive. In the embodiment of Fig. 6, the sections of sector 60'' are of progressively varying density, while the segments of sector 80'' are of repetitive varying densities. In this manner, the response curves of the photoelectric cells will be the same as those described in conjunction with Figs. 7 and 8, inasmuch as the photoelectric cells are responsive to the characteristic of the light emanating from the source as modified by the sectors, be they portions of the visible spectrum, variable area, or variable density.

From the foregoing, it is manifest that this invention provides unique means for indicating blade angle wherein no mechanical, or electrical, connections are required between relatively rotatable portions of the aircraft. Accordingly, the possibility of failure is extremely remote, and the accuracy of the indicating device is vastly superior to devices heretofore developed.

While the embodiment of the present invention as herein disclosed, constitutes a preferred form, it is to be understood that other forms might be adopted.

What is claimed is as follows:

1. The combination with a propeller assembly including a hub rotatable about its horizontal axis and a blade supported by said hub for rotation about its longitudinal axis to different pitch positions, of means for indicating the angular position of said blade comprising, a stationary light source, a pair of concentric colored sectors carried by said blade and rotatable with said blade during pitch changing movements thereof, means for transmitting light from said source to said colored sectors during each revolution of said propeller, said colored sectors altering the wave length of light from said source in relation to the angular position of said blade, light sensitive means responsive to the wave length of light as altered by said colored sectors for indicating the pitch angle of said blade, and means for transmitting light from said colored sectors to said light sensitive means during each revolution of said propeller.

2. The combination set forth in claim 1 wherein both of said colored sectors are divided into segments of equal arcuate extent, wherein one of said sectors is further divided into a plurality of portions equal in number to the number of said segments, and wherein the portions of each segment in said one sector are arranged so that the wave length of light transmitted thereby varies progressively in relation to the angular position of said blade.

3. The combination set forth in claim 2 wherein the color arrangement of the portions in each segment of said one member is repeated, and wherein the segments of said other member are arranged so that the wave length of light transmitted thereby varies progressively in relation to the angular position of said blade, in the same progression as that of said portions.

4. The combination with a propeller assembly including, a hub rotatable about its horizontal axis and a blade supported in said hub for rotation about its longitudinal axis to different pitch positions, of means for indicating the pitch angle of said blade comprising, a light source, means carried by said propeller blade and rotatable therewith during pitch changing movements thereof for altering the characteristic of light from said source in relation to the pitch angle of said propeller blade, and means responsive to the light as altered by said first recited means for indicating the pitch angle of said propeller blade.

5. The combination with a propeller assembly including, a hub rotatable about its longitudinal axis and a blade supported in said hub for rotation about its longitudinal axis to different pitch positions, of means for indicating the pitch angle of said blade comprising, a light source, colored means carried by said propeller blade and rotatable therewith during pitch changing movements thereof for varying the wave length of light from said source in relation to the pitch angle of said propeller blade, and means responsive to the wave length of light as varied by said first recited means for indicating the pitch angle of said propeller blade.

6. The combination with a propeller assembly including, a hub rotatable about its horizontal axis and a blade supported in said hub for rotation about its longitudinal axis to different pitch positions, of means for indicating the pitch angle of said blade comprising, a stationary light source, means carried by said blade and rotatable therewith during pitch changing movements thereof for varying the characteristic of light, means for transmitting light from said source to said light characteristic varying means during each revolution of the propeller about its horizontal axis, said light characteristic varying means altering the characteristic of light from said source in relation to the pitch angle of the propeller blade, light sensitive means responsive to the characteristic of light as altered by said light characteristic varying means for indicating the pitch angle of said propeller blade, and means for transmitting light from said light characteristic varying means to said light sensitive means during each revolution of said propeller about its horizontal axis.

7. A device for indicating the angular position of an element rotatable about its longitudinal axis including, a member supporting said element and rotatable about an axis located at an angle to the longitudinal axis of said element, a stationary light source, means carried by the element and rotatable therewith during rotation of said element about its longitudinal axis for varying the character of light, means for transmitting light from said source to said light character varying means during each revolution of said member about its axis of revolution, stationary light sensitive means responsive to the character of light as altered by said light character varying means for indicating the angular position of said element, and means for transmitting light from said light character varying means to said light sensitive means during each revolution of said member about its axis of revolution.

References Cited in the file of this patent

UNITED STATES PATENTS

| | | |
|---|---|---|
| 1,898,642 | Ogle | Feb. 21, 1933 |
| 2,071,284 | Hyland | Feb. 16, 1937 |
| 2,378,526 | Agnew | June 19, 1945 |